UNITED STATES PATENT OFFICE.

CARL GRÜNZWEIG, OF LUDWIGSHAFEN-ON-THE-RHINE, GERMANY.

WATER-PROOF COMPOUND CONTAINING CORK.

SPECIFICATION forming part of Letters Patent No. 395,438, dated January 1, 1889.

Application filed June 13, 1888. Serial No. 276,960. (Specimens.)

*To all whom it may concern:*

Be it known that I, Dr. CARL GRÜNZWEIG, residing at Ludwigshafen-on-the-Rhine, in the Empire of Germany, a subject of the Emperor of Germany, have invented new and useful Improvements in Water-Proof Compounds Containing Cork or an Equivalent Bad Conductor of Heat, of which the following is a specification.

According to my invention cork reduced to small fragments is coated on the surface with a very thin layer of water-proof compound consisting of a mixture of resins and artificial or natural asphalt, the proportions of which may vary, or which may also be used separately, such coating of the cork being effected in any suitable heated mixing apparatus. By this means are obtained granules with lustrous coating adhering slightly together, the specific gravity of which in the loose condition is 0.14, or less. These granules are introduced hot into a previously-heated mold coated internally with graphite, in which they are compressed into a uniformly-compact mass, the specific gravity of which is 0.5, or less. The article produced will have all of the qualities of cork and is capable of many of its uses, it being of the same granular appearance as cork, as well as elastic and a non-conductor of heat. The addition of the resin renders the asphalt harder and more elastic, and at the same time lessens its adhesiveness, so that when coated the granules will not lose their individuality and stick together prior to compression, but will remain separate and disconnected as before coating.

I make no claim to asphaltum having granulated cork incorporated therewith while in a liquid state for purposes of waterproofing a surface when applied by a brush, as such is foreign to my invention in every way.

Having thus described my invention and the manner of employing the same, what I claim, and wish to have secured to me by Letters Patent of the United States of America, is—

1. As an improved article of manufacture, a granular water-proof and non-heat-conducting compound consisting of ground cork the granules of which are provided with a thin external coating of resin and asphalt, substantially as set forth.

2. As an improved article of manufacture, a compressed water-proof and non-heat-conducting block or body formed of granules of cork coated thinly externally with resin and asphalt, substantially as set forth.

In testimony whereof I have signed my name to this specification in the presence of two subscribing witnesses.

CARL GRÜNZWEIG.

Witnesses:
 HEINRICH RAPPENEGGER,
 GUSTAV HALLMAYER.